United States Patent

Wolf

[11] 3,953,776
[45] Apr. 27, 1976

[54] DIGITAL MOTOR SPEED CONTROL CIRCUIT

[75] Inventor: Robert F. Wolf, Waukesha, Wis.

[73] Assignee: Waukesha Foundry Company, Inc., Waukesha, Wis.

[22] Filed: Dec. 16, 1974

[21] Appl. No.: 527,573

Related U.S. Application Data

[63] Continuation-in-part of Ser. No. 425,013, Dec. 14, 1973.

[52] U.S. Cl. .............................. 318/312; 318/328; 318/313
[51] Int. Cl.² .......................................... H02P 5/06
[58] Field of Search .......... 318/306, 308, 309, 310, 318/311, 312, 313, 318, 301, 315, 326, 327, 328

[56] References Cited
UNITED STATES PATENTS
3,646,417    2/1972    Cassie et al. ................... 318/318

Primary Examiner—B. Dobeck
Attorney, Agent, or Firm—Wheeler, Morsell, House & Fuller

[57] ABSTRACT

A tachometer pulse generator is coupled to the shaft of an electric motor. The output of the pulse generator is gated into a pulse counter circuit during a first fixed time interval. During a second fixed time interval which follows the first fixed time interval, the motor is speeded up if the count attained by the counter in the preceeding first time interval is less than a preset number or is slowed down if the count is equal to or greater than the preset number. The first and second time intervals follow each other periodically, thereby alternately measuring the speed of the motor and correcting the same to approach a preset speed which is proportional to the preset number of the counter circuit. Two preset numbers can be employed, one corresponding to a lower speed correction threshold and the other corresponding to an upper speed correction threshold. The motor is speeded up if the count attained by the counter is below the lower speed correction threshold or is slowed down if the count attained by the counter is equal to or above the upper speed correction threshold. No correction is made when the count attained by the counter is equal to the lower threshold number or is between the two threshold numbers.

13 Claims, 5 Drawing Figures

3,953,776

DIGITAL MOTOR SPEED CONTROL CIRCUIT

CROSS REFERENCE TO RELATED APPLICATIONS

This application is a Continuation-In-Part of U.S. patent application Ser. No. 425,013 filed on Dec 14, 1973 for a "Digital Motor Speed Control Circuit".

BACKGROUND OF THE INVENTION

This invention relates to digital motor speed controls of a type similar to those disclosed in the following U.S. patents: Haner et al. U.S. Pat. No. 3,543,116; Jones U.S. Pat. No. 3,110,853; Loyd U.S. Pat. No. 3,546,553; Gifft U.S. Pat. No. 3,176,208; and Strand et al. U.S. Pat. No. 3,331,006. These patents disclose several circuits in which the speed of an electric motor is controlled through the use of digital circuits to approach a preset desired speed value. In these circuits, the actual speed of the motor is measured by means of a tachometer pulse generator coupled to the motor shaft. An adjustable frequency oscillator is preset to a frequency which is proportional to a desired speed value for the motor. The frequency of the tachometer pulse generator output is compared to the preset frequency in a digital frequency comparison circuit. If the tachometer pulse generator frequency is lower than the preset frequency, the motor is speeded up, and if the tachometer pulse generator frequency is above the preset frequency, the motor is slowed down. The speed measurement and speed comparison functions are continuous and occur concurrently with the speed correction.

However, in accordance with this invention, it has been found that the speed measurement, speed comparison, and speed control circuits can be greatly simplified by measuring the motor speed and determining whether it is fast or slow in a first fixed time interval and then correcting the motor speed in a second fixed time interval which follows the first time interval. This time division between speed measurement and speed correction eliminates the need for an adjustable oscillator and frequency comparison circuit and also significantly simplifies the speed correction circuit. This simplification of the circuit provides a substantial reduction in cost and increase in reliability.

SUMMARY OF THE INVENTION

A tachometer pulse generator is coupled to a shaft. The output of the pulse generator is gated into a pulse counter circuit during a fixed first time interval. During a second fixed time interval which follows the first fixed time interval, the shaft is speeded up if the count attained by the counter in the preceeding first time interval is less than a preset number or is slowed down if the count is equal to or greater than the preset number. The first and second time intervals follow each other periodically, thereby alternately measuring the speed of the shaft and then correcting the same to approach a preset speed which is proportional to the preset number of the counter circuit. Two preset numbers can be employed, one corresponding to a lower speed correction threshold and the other corresponding to an upper speed correction threshold. The shaft is speeded up if the count attained by the counter is below the lower speed correction threshold or is slowed down if the count attained by the counter is equal to or above the upper speed correction threshold. No correction is made when the count attained by the counter is equal to the lower threshold number or is between the two threshold numbers.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Although the speed control circuit of this invention may be utilized in combination with any type of motor, whether driven by steam, air, hydraulic fluid, internal combustion, or electricity, it is most commonly utilized in connection with electric motors and will be described in connection therewith.

Figure 1:
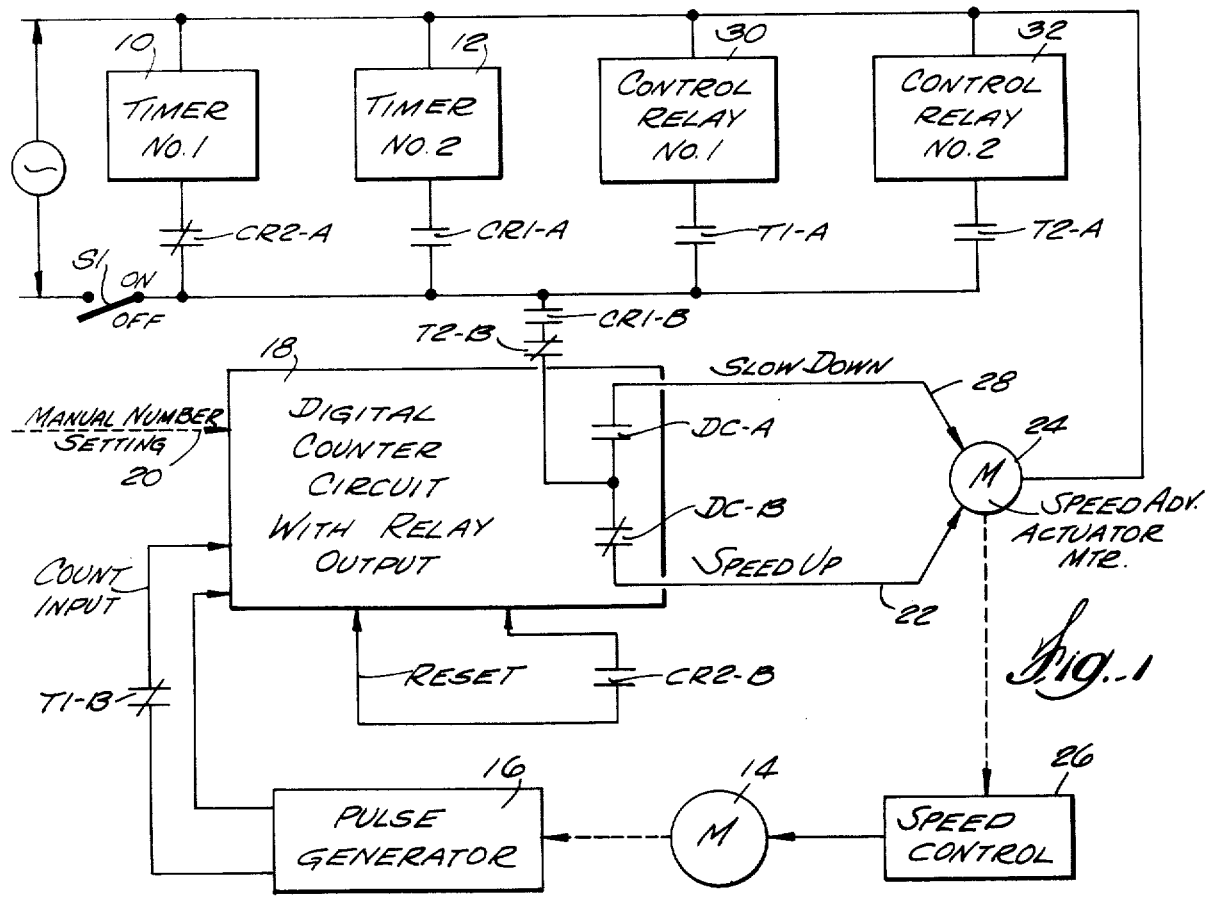
FIG. 1 is a schematic circuit diagram and block diagram of one embodiment of the invention.

The basic principle of this invention is to define a first fixed time interval in which the speed of the motor is measured and compared to a preset desired speed value followed by a second fixed time interval in which an increment of speed correction is applied to the motor to bring the motor speed closer to the desired speed value. The two fixed time intervals recur periodically one after another. Referring to FIG. 1, in one embodiment of the invention, a first timer 10 has normally open contacts T 1-A which close at the end of the timed interval and has normally closed contacts T 1-B which open at the end of the timed interval. A second timer 12 has normally open contacts T 2-A which close at the end of the timed interval and normally closed contacts T 2-B which open at the end of the timed interval. In both timers 10 and 12, after the contacts are opened or closed at the end of the timed interval, they remain in that state until the timer is reset to its starting condition by being de-energized. The timers 10 and 12 may be digital timers, R C timers, or any other suitable timers. The two timed intervals may, for example, be one second each, although longer or shorter intervals may be used if desired to meet the needs of a particular application. The two timed intervals may be equal or unequal as desired.

The actual rotary speed of an electric motor 14 or any shaft whose rotary speed is to be controlled is measured through the use of a tachometer pulse generator 16 which is coupled to a shaft, for instance the shaft of motor 14. Tachometer pulse generator 16 may include one or more permanent magnets affixed to the shaft of motor 14 and a stationary winding fixed adjacent to the path of the magnets. Each time one of the magnets moves past the winding it generates an electrical pulse by electromagnetic induction. The number of pulses per unit time is proportional to the rotary speed of the motor shaft.

During the first time interval, which is measured by timer 10, the output of pulse generator 16 is gated into a digital counter circuit 18 through normally closed contacts T 1-B. Counter circuit 18 has a manual number setting 20 for presetting a count number into the circuit. When the count of input pulses equals the preset count number, a pair of normally open contacts DC-A are closed and a pair of normally closed contacts DC-B are opened. The contacts DC-A and DC-B remain in their actuated states, i.e. closed and open respectively, until the digital counter circuit is reset, at which time contacts DC-A and DC-B return to their normal state. The pulse input to counter 18 terminates at the end of the first time interval and the state of contacts DC-A and DC-B at that time indicates whether the count is above or below the preset count number.

At the end of the first time interval and the start of the second time interval, a voltage is applied through contacts CR1-B and T2-B to contacts DC-A and DC-B in parallel for the duration of the second time interval. If the number of input pulses applied to counter circuit 18 was below the preset count number in the preceeding first time interval, contacts DC-B will be closed and contacts DC-A will be opened. The voltage is then applied through contacts DC-B to an input conductor 22 of a speed adjusting actuator motor 24. This causes the motor 24 to turn a speed control 26 in such direction as to increase the speed of motor 14. If the number of input pulses applied to counter circuit 18 was above the preset count number in the preceeding time interval, the voltage from contacts CR1-B and T2-B would be applied through contacts DC-A to a second input conductor 28 of speed adjusting actuator motor 24. This causes the motor 24 to turn the speed control 26 in such direction as to decrease the speed of motor 14. The movement of speed adjusting actuator motor 24 and speed control 26 terminate at the end of the second time interval, at which time contacts T2-B open following which contacts CR1-B return to their normally open state.

The speed adjusting actuator motor 24 may be suitable bidirectional AC motor which has one input for rotating the motor shaft in one direction and a second input for rotating the motor shaft in the other direction. The speed control 26 may be any suitable means for controlling the speed of motor 14, e.g. a field control potentiometer, or a mechanism for controlling pulley ratios, or any other suitable speed control, many of which are known in the art. The rate of speed adjustment in either direction, and the duration of the respective time intervals, are chosen to minimize deviation from desired shaft speed, and preferably to minimize hunting, having due regard for the magnitude of the speed corrections likely to be needed for the shaft being monitored.

The operation of the above described speed control circuit will be traced through one illustration operating cycle as follows:

Start.

Off–On switch S1 is turned on. This applies voltage through normally closed contacts CR2-A to the first timer 10, which begins its timing cycle. Pulses are applied from pulse generator 16 through normally closed contacts T1-B to digital counter circuit 18. The remaining portions of the circuit are maintained in de-energized state by normally open contacts CR1-A, CR1-B, T1-A and T2-A.

End of First Time Interval.

The first timer 10 finishes its timing cycle and closes normally open contacts T1-A and opens normally closed contacts T1-B. Contacts T1-B interrupt the input to digital counter circuit 18. Contacts T1-A energize a first control relay 30, which closes contacts CR1-A and CR1-B. Contact CR1-A energizes the second timer 12 and starts its timing cycle. Contact CR1-B energizes the input to speed adjusting actuator motor 24 to speed up or slow down the motor 14 depending on which of the contacts DC-A or DC-B are closed. If contact DC-B is closed, the input voltage is routed through input conductor 22 and speeds up motor 14. If contact DC-A is closed, the input voltage is routed through input conductor 28 and slows down motor 14.

End of Second Time Interval

The second timer 12 finishes its timing cycle and closes normally open contacts T2-A and opens normally closed contacts T2-B. Contacts T2-B open the circuit to contacts DC-A and DC-B. Contacts T2-A energize a second control relay 32, which opens normally closed contacts CR2-A and resets the first timer 10. Contacts CR2-B close and reset digital counter circuit 18. Resetting the first timer 10 opens contacts T1-A and closes contacts T1-B. Opening of contacts T1-A de-energizes the first control relay 30, which opens contacts CR1-A and CR1-B. This resets the second timer 12, which opens contacts T2-A and closes contacts T2-B. This de-energizes the second control relay 32, thereby closing contacts CR2-A and initiating another timing cycle of the first timer 10.

The above described cycle is repeated continuously, with input pulses being gated into counter 18 during each first time interval and the speed adjusting actuator motor 24 being energized during each second time interval, thereby alternately measuring the speed of motor 14 and correcting its speed to approach a predetermined speed which is proportional to the preset count number in counter circuit 18.

Figure 2:
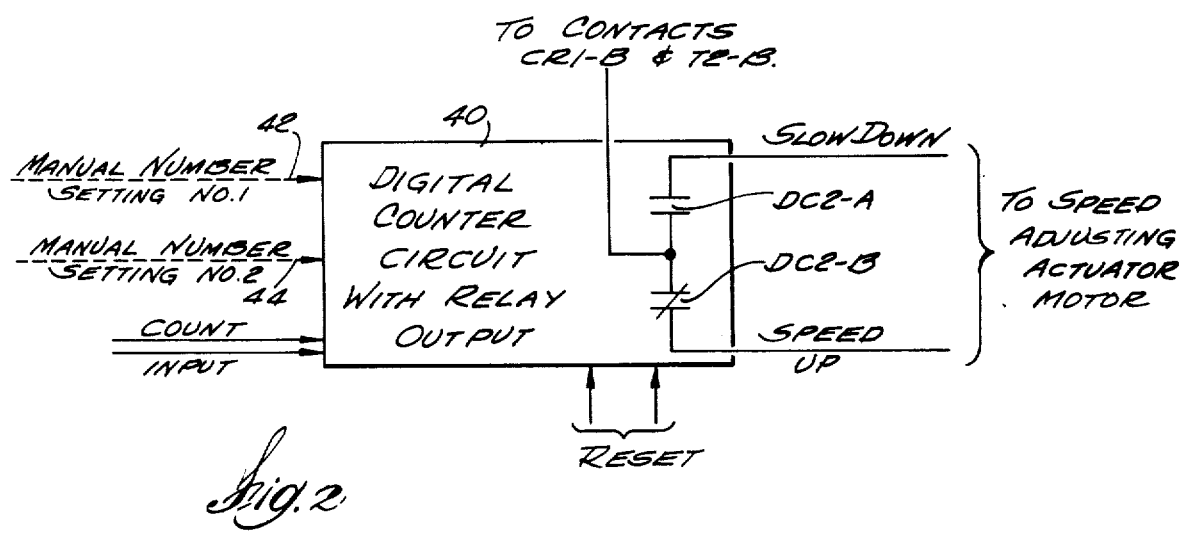
FIG. 2 is a schematic circuit diagram and block diagram of a modification in the embodiment of FIG. 1.

In the above described circuit, the speed of motor 14 hunts around the speed corresponding to the preset count number. This hunting can be eliminated if desired by using a digital counter circuit which has two presettable numbers, one of which corresponds to a lower speed correction threshold and the other of which corresponds to an upper speed correction threshold. Such a modified counter is illustrated in FIG. 2 in which a digital counter circuit 40 is shown having two manual number settings 42 and 44. Counter circuit 40 is shown having two manual number settings 42 and 44. Counter-circuit 40 has a set of normally open contacts DC2-A and a set of normally closed contacts DC2-B. Contacts DC2-B open when the count attained by the counter is equal to or above the lower of the two presettable numbers. Contacts DC2-A close when the count attained by the counter is equal to or above the higher of the two presettable numbers. When the count attained by the counter is equal to the lower threshold number or is between the two presettable numbers, both contacts DC2-A and DC2-B are open, which prevents the speed adjusting actuator motor 24 from either speeding up or slowing down the motor 14. Thus, the modified counter shown in FIG. 2 eliminates hunting and allows the speed of the controlled motor to remain unchanged when it falls on the lower or between presettable upper and lower speed correction thresholds.

The electronic components shown in FIGS. 1 and 2 are all standard circuit components that are currently available as off-the-shelf items either from electronic supply houses or from manufacturers. Timers 10 and 12 (FIG. 1) can be ATC Shawnee Model 335 solid state timers, 0.01 to 99.99 seconds, which are manufactured by the Automatic Timing and Controls Co., of King of Prussia, Pennsylvania. Digital counter circuits 18 and 40 can be Durant Series 2000 digital counters, 4 digit, 1 or 2 predetermining levels, light emitting diode readout, 5 VDC input, which are manufactured by the Durant Digital Instruments Company of Watertown, Wisconsin. Control relays 30 and 32 can be model 234 KSH 17A11 Potter and Brumfield relays, 120 VAC, hermetically sealed. Motor 24 can be a Reliance AD 3780 009, electric remote control, intermittant duty AC motor, single-phase, 60 Hz. Motor 14 can be a Reliance 230/460 VAC, 3 phase, 60 Hz., continuous duty motor. Speed control 26 can be a Reeves Motor-drive variable speed drive unit. Pulse generator 16 can be an Airpax Model 4-0001, Hall effect magnetic pickup with 5VDC input. It should be understood, however, that the above noted components are given as examples only and that many other components are known and are available which are suitable for use in connection with the embodiments of FIGS. 1 and 2.

Figure 3:
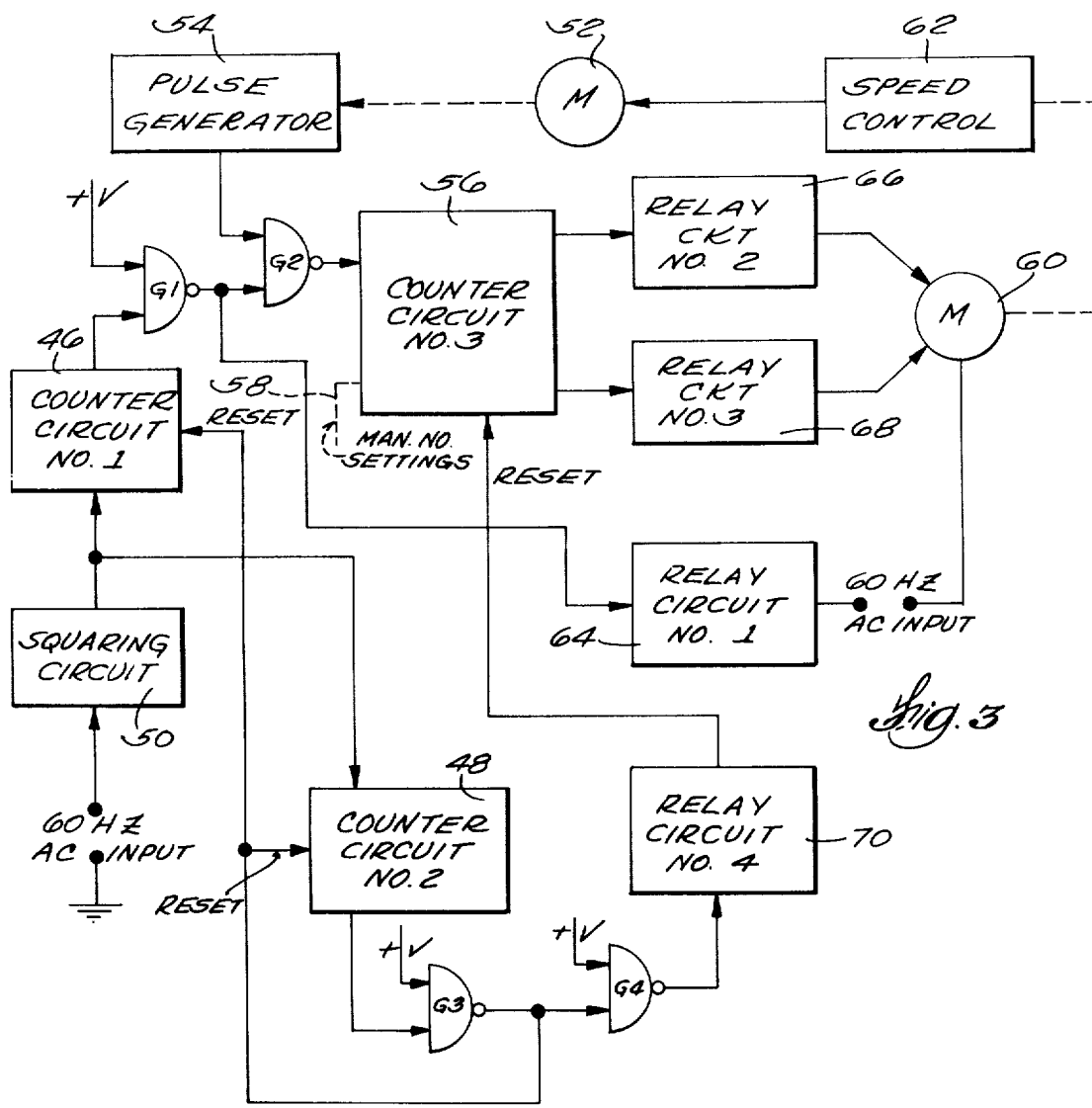
FIG. 3 is a block diagram of another embodiment of the invention.
Figure 4:
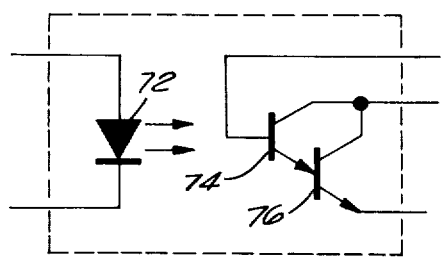
FIG. 4 is a schematic diagram of one relay circuit for use in the circuit of FIG. 3.
Figure 5:
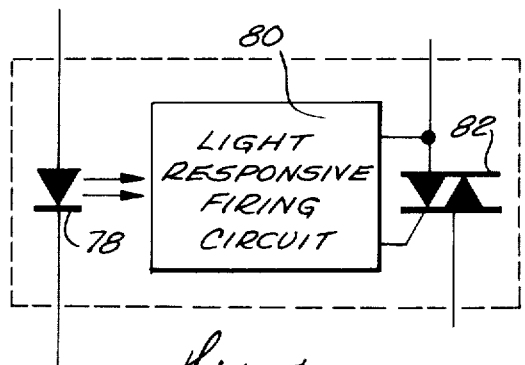
FIG. 5 is a schematic diagram of another relay circuit for use in the circuit of FIG. 3.

FIGS. 3 to 5 illustrate a second embodiment of the invention in which the timing function is performed by two digital counter circuits 46 and 48 which both receive input pulses from a squaring circuit 50 which is continuously energized by a 60 Hz. sine wave input and continuously produces a 60 Hz. square wave output. The time required for counter circuit 46 to count from zero to its total count is the first time interval during which the rotational speed of a motor 52 is measured by gating the output of a tachometer pulse generator 54 through a NAND gate G2 into the input of a digital counter circuit 56, which is substantially the same as counter circuit 18 described in connection with the embodiment of FIG. 1. In a typical example, counter circuit 46 can have a 60 step counting cycle, and in this case the first time interval will be one second long. The other circuit 48 always has a longer counting cycle than counter circuit 46, the difference between the two being a measure of the second time interval which follows the first time interval. For example, in the case where counter circuit 46 has a 60 step counting cycle, counter circuit 48 may have a 72 step counting cycle. Both counter circuits 46 and 48 are reset by the same signal and start counting at the same time. After 1 second of counting has elapsed, counter circuit 46 will reach the end of its 60 step counting cycle and send a signal to gate G1, thereby terminating the first time interval and starting the second time interval. At this time, counter circuit 48 is on the 60th step of its 72 step counting cycle and has 12 steps to go before it produces an output signal to gate G3. The second time interval in this example is thus equal to 12 steps times 1/60 second = 1/5 of a second. It should be understood, however, that other time lengths could be used for the first and second time intervals if desired.

Counter circuit 56, which counts the output of tachometer pulse generator 54, has a manual number setting 58 which is set to a value that is proportional to the desired speed for motor 52. When the count of counter circuit 56 is below manual number setting 58, counter 56 actuates relay circuit 68. When the count of counter circuit 56 equals or is greater than manual number setting 58, counter 56 actuates relay circuit 66. Thus, the state of relay circuits 66 and 68 at the end of the first time interval is dependent on whether the rotational speed of motor 52 is above or below the desired level indicated by manual number setting 58. If the speed is low, relay circuit 68 will be actuated. If the speed is high, relay circuit 66 will be actuated.

Motor 60 is a bidirectional control motor which can be the same as motor 24 described in connection with FIG. 1. Motor 60 drives a speed control 62 which can be the same as the speed control 26 described in connection with FIG. 1. When motor 60 turns in one direction, it causes speed control 62 to speed up motor 52, and when motor 60 turns in the opposite direction, it causes speed control 62 to slow down motor 52. Motor 60 is energized by a 60 Hz. AC input by relay circuit 64, which is energized at the start of the second time interval by NAND gate G1. Either one or the other of the relay circuits 66 and 68 is energized at the start of the second time interval, depending on whether motor 52 is fast or slow, relay circuit 66 causing motor 60 to turn in the direction which slows down motor 52, and relay circuit 68 causing motor 60 to turn in the direction which speeds up motor 52. The slowing down or speeding up of the motor 52 continues during the second time interval and terminates at the end of the second time interval.

The second time interval ends when counter circuit 48 reaches the end of its counting sequence and enables NAND gate G3, whose output enables NAND gate G4 and also resets both counter circuits 46 and 48 to start the next first time interval. Gate G4 energizes relay circuit 70, which resets counter circuit 56 and starts another motor speed counting cycle as described above. The motor speed counting cycle and the motor speed correction cycle recur periodically with the result that the speed of motor 52 hunts around the level indicated by the manual number setting 58. This hunting can be eliminated if desired through the use of the digital counter circuit 40 of FIG. 2 which has two manual setting numbers 42 and 44. The manual setting numbers 42 and 44 can be set to represent upper and lower speed thresholds as explained in connection with the circuit of FIG. 1 These two manual setting numbers can be set in individually in a standard two pre-set number counter or as one number in a special two pre-set number counter. In the case of the latter for example, setting in the number 100 could result in the number 101 automatically being set in.

Two solid state relay circuits which are suitable for use in connection with relay circuits 64, 66, 68 and 70 are shown in FIGS. 4 and 5. The circuit of FIG. 4 can be used for relay circuit 70 and includes a light emitting diode 72 which is optically coupled to a photo-sensitive transistor 74 whose emitter is coupled to the base of an amplifier transistor 76. The circuit of FIG. 5 can be used for relay circuits 64, 66 and 68 and includes a light emitting diode 78, a light responsive firing circuit 80 optically coupled to light emitting diode 78, and a triac 82 coupled to the output of firing circuit 80. Although the relay circuits of FIGS. 4 and 5 are preferable, it should be understood that any suitable relay circuits can be used for relay circuits 64, 66, 68 and 70, including standard electromagnetic relays.

The electronic components shown in FIGS. 3, 4 and 5 are all standard circuit components that are currently available as off-the-shelf items either from electronic supply houses or from manufacturers. Squaring circuit 50 can be an International Rectifier 2N 5338A Zener diode. Counter circuit 46 can be one Fairchild 9392/7492 divide by 12 counter and one Fairchild 9390/7490 divide by 10 counter connected to produce a divide by 60 counter. Counter circuit 48 can be two Fairchild 9392/7492 divide by 12 counters connected to produce a divide by 72 counter. Counter circuit 56 can be a Durrant Series 2000 digital counter, 4 digit, 1 or 2 predetermining levels, light emitting diode readout, 5 VDC input. Gates G1–G4 can be a Fairchild 9N00/7400 quad, two input NAND package. Pulse generator 54 can be an Airpax Model 4-0001 Hall effect magnetic pickup with 5 VDC output and −12 VDC input. Relay circuit 70 can be a Monsanto MCA2-30 optically coupled photo Darlington DC solid state switch, 125 MA at 30 VDC. And relay circuits 64, 66 and 68 can be Clare 203A05A1A optically coupled solid state relay, 3A 115 VAC triac output. It should be understood, however, that the foregoing components are given as examples only and that many other components are known and available which are suitable for use in connection with the embodiment of FIGS. 3, 4 and 5.

What is claimed is:

1. A speed control circuit comprising a rotatable shaft, a pulse generator coupled to the shaft for generating electrical pulses at a frequency that is proportional to the rotary speed of the shaft, pulse counter means having at least one presettable number associated therewith and having means for indicating the relative magnitude of the count attained by said counter and each said presettable number, means for gating the output of said pulse generator into said counter means during a first fixed time interval which is long compared to the rotational period of said shaft, and means for varying the speed of said shaft in a predetermined direction during a second fixed time interval which follows said first time interval if the count attained by said counter in the preceeding first time interval has a predetermined magnitude relative to said presettable number, and means for restarting said first time interval following the end of said second time interval.

2. The combination defined in claim 1 wherein said counter has one presettable number associated therewith, and wherein the last mentioned means comprises means for speeding said shaft up in said second time interval if the count attained by said counter in the preceeding first time interval is smaller than said presettable number or for slowing said shaft down in said second time interval if the count attained by said counter in the preceeding first time interval is equal to or larger than said presettable number.

3. A speed control circuit comprising a shaft, a pulse generator coupled to the shaft for generating electrical pulses at a frequency that is proportional to the speed of the shaft, counter means having at least one presettable number associated therewith and having means for indicating the relative magnitude of the count attained by said counter and each said presettable number, means for gating the output of said pulse generator into said counter means during a first fixed time interval, and means for varying the speed of said shaft in a predetermined direction during a second fixed time interval which follows said first time interval if the count attained by said counter in the preceeding first time interval has a predetermined magnitude relative to said presettable number, and means for restarting said first time interval following the end of said second time interval, said counter having two presettable numbers associated therewith, and wherein said means for varying the speed of said shaft comprises means for speeding said shaft up in said second time interval if the count attained by said counter in the preceeding first time interval is less than the smaller of the two presettable numbers or for slowing said shaft down in the second time interval if the count attained by said counter in the preceeding first time interval is equal to or greater than the larger of the two presettable numbers.

4. A speed control circuit comprising a shaft, a pulse generator coupled to the shaft for generating electrical pulses at a frequency that is proportional to the speed of the shaft, counter means having at least one presettable number associated therewith and having means for indicating the relative magnitude of the count attained by said counter and each said presettable number, means for gating the output of said pulse generator into said counter means during a first fixed time interval, and means for varying the speed of said shaft in a predetermined direction during a second fixed time interval which follows said first time interval if the count attained by said counter in the preceeding first time interval has a predetermined magnitude relative to said presettable number, and means for re-starting said first time interval following the end of said second time interval, said first and second time intervals being measured by first and second timers respectively, and further comprising means coupling the output of said first timer to the input of said second timer for initiating the timing of said second time interval, and said means for re-starting comprising coupling the output of said second timer to the input of said first timer to initiate another first time interval at the end of said second time interval.

5. The combination defined in claim 4 wherein said first timer has at least one set of normally closed contacts which open at the end of the first time interval and remain open until the timer is reset, at which time said normally closed contacts close, said contacts being coupled in series between the output of said pulse generator and the input of said counter and serving to gate the output of said pulse generator into said counter during each first time interval.

6. The combination defined in claim 4 wherein said first timer has at least one set of normally open contacts which close at the end of said first time interval and remain closed until the timer is reset, at which time said normally open contacts open, and further comprising means coupling said normally open contacts to a first control relay for energizing the same when said contacts close, said first control relay having a first and a second set of normally open contacts, means coupling said first set of normally open contacts to said second timer to initiate the timing of said second time interval at the end of said first time interval, and means coupling said second set of normally open contacts to said means for varying the speed of said motor during said second time interval.

7. The combination defined in claim 4 wherein said counter has a set of normally open contacts which close when the counter attains a count equal to or greater than said presettable number and wherein said counter has a set of normally closed contacts which open when the counter attains a count equal to or greater than said presettable number, and means coupling said normally open and normally closed contacts to respective speed decreasing and speed increasing inputs of said means for varying the speed of said motor during said second time interval.

8. The combination defined in claim 7 and further comprising means for applying a voltage to one side of said normally open and normally closed contacts only during said second time interval.

9. The combination defined in claim 8 wherein said means for varying the speed of said shaft comprise a shaft speed control and a speed adjusting actuator motor coupled thereto, said normally open and normally closed contacts being coupled to respective directional inputs to said speed adjusting actuator motor to actuate the same during said second time interval.

10. The combination defined in claim 4 wherein said second timer has at least one set of normally open contacts which close at the end of said second time interval and remain closed until the timer is reset, at which time said contacts open, and means coupling said normally open contacts to the reset portion of said counter to reset the same at the end of said second time interval.

11. The combination defined in claim 1 and further comprising second and third pulse counter means, a pulse train source coupled in parallel to the input of said second and third counters to simultaneously step the counters through their counting sequences, the counting sequence of said third counter being longer than the counting sequence of said second counter, the output of said second counter signifying the end of said first time interval and the start of said second time interval, and the output of said third counter signifying the end of said second time interval and the start of the next first time interval.

12. The combination defined in claim 11 and further comprising means connected between the output of said third counter and the reset means for said second couter and said third counter for simultaneously resetting said second and third counters at the end of said second time interval.

13. The combination defined in claim 12 and further comprising means connected between the output of said third counter and the reset means for the first mentioned counter for resetting the same at the end of said second time interval.

* * * * *